United States Patent
Xie et al.

(10) Patent No.: US 11,402,959 B2
(45) Date of Patent: Aug. 2, 2022

(54) TOUCH STRUCTURE, TOUCH PANEL AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Xiaodong Xie, Beijing (CN); Ming Hu, Beijing (CN); Min He, Beijing (CN); Jing Wang, Beijing (CN); Ming Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/737,670

(22) Filed: Jan. 8, 2020

(65) Prior Publication Data

US 2020/0142543 A1    May 7, 2020

Related U.S. Application Data

(63) Continuation of application No. 15/508,756, filed as application No. PCT/CN2016/098569 on Sep. 9, 2016, now abandoned.

(30) Foreign Application Priority Data

Oct. 29, 2015    (CN) .......................... 201520867754.7

(51) Int. Cl.
*G06F 3/044*      (2006.01)
*G02F 1/1343*     (2006.01)
(Continued)

(52) U.S. Cl.
CPC .......... *G06F 3/0446* (2019.05); *G02F 1/1343* (2013.01); *G06F 3/0412* (2013.01);
(Continued)

(58) Field of Classification Search
CPC ......... G06F 3/0412; G06F 3/044–0448; G06F 2203/04111
See application file for complete search history.

(56) References Cited

U.S. PATENT DOCUMENTS 5,844,506 A * 12/1998 Binstead ............ H03K 17/9622
                                          341/20
8,638,316 B2 * 1/2014 Badaye ................. G06F 3/0443
                                         345/173
(Continued)

FOREIGN PATENT DOCUMENTS

CN       101520708 A      9/2009
CN       101609384 A     12/2009
(Continued)

OTHER PUBLICATIONS

ISR and Written Opinion dated Nov. 30, 2016; PCT/CN2016/098569.
(Continued)

*Primary Examiner* — Patrick F Marinelli

(57) ABSTRACT

A touch structure, a touch panel and a display device are provided. The touch structure includes a plurality of repeating units. Each of the repeating units includes: a first touch electrode extending in a first direction, the first touch electrode including two parts connected with each other, each part of the first touch electrode including a first section having a first width, a second section having a second width, and a first tip section; a second touch electrode extending in a second direction, the second touch electrode including two parts, each part of the second touch electrode including a third section having a third width and a second tip section;
(Continued)

and dummy electrodes provided in regions of each of the repeating units not provided with the first touch electrode and the second touch electrode.

18 Claims, 8 Drawing Sheets

(51) Int. Cl.
  *G06F 3/041* (2006.01)
  *G02F 1/1333* (2006.01)
(52) U.S. Cl.
  CPC .......... *G06F 3/0443* (2019.05); *G06F 3/0448* (2019.05); *G02F 1/13338* (2013.01); *G06F 2203/04103* (2013.01)

(56) References Cited

U.S. PATENT DOCUMENTS

| | | | | |
|---|---|---|---|---|
| 8,654,094 B2* | 2/2014 | Bae | G06F 3/0448 345/173 |
| 8,901,944 B2* | 12/2014 | Chai | H03K 17/9622 345/173 |
| 8,957,874 B2* | 2/2015 | Elias | G06F 3/0446 345/174 |
| 8,963,008 B2* | 2/2015 | Lai | G06F 3/0443 361/679.01 |
| 9,379,704 B2* | 6/2016 | Yang | G06F 3/0446 |
| 9,582,131 B2* | 2/2017 | Elias | G06F 3/045 |
| 9,671,914 B2* | 6/2017 | Kim | G06F 3/0443 |
| 9,684,417 B2* | 6/2017 | Lu | G06F 3/0446 |
| 9,823,801 B2* | 11/2017 | Chan | G06F 3/047 |
| 10,067,615 B2* | 9/2018 | Kim | G06F 3/04164 |
| 10,521,059 B2* | 12/2019 | Zhang | G06F 3/0446 |
| 10,572,079 B2* | 2/2020 | He | G06F 3/0445 |
| 10,739,928 B1* | 8/2020 | Ye | G06F 3/0448 |
| 10,884,533 B2* | 1/2021 | Lin | G09G 3/20 |
| 11,221,716 B2* | 1/2022 | Tian | G06F 3/0446 |
| 11,269,472 B2* | 3/2022 | Wang | G06F 3/0412 |
| 2009/0084613 A1* | 4/2009 | Yang | G06F 3/0446 178/18.06 |
| 2009/0213090 A1* | 8/2009 | Mamba | G06F 3/0446 345/174 |
| 2010/0328228 A1* | 12/2010 | Elias | G06F 3/0446 178/18.05 |
| 2011/0267309 A1* | 11/2011 | Hanauer | G06F 3/044 345/174 |
| 2011/0316567 A1* | 12/2011 | Chai | G06F 3/0446 324/686 |
| 2012/0081300 A1* | 4/2012 | Chan | G06F 3/0446 345/173 |
| 2012/0182230 A1* | 7/2012 | Wang | G06F 3/0443 345/173 |
| 2013/0153391 A1* | 6/2013 | Liu | H03K 17/9622 200/600 |
| 2013/0264095 A1* | 10/2013 | Lai | G06F 3/041 174/126.1 |
| 2014/0062955 A1 | 3/2014 | Hotelling et al. | |
| 2014/0174902 A1* | 6/2014 | Yang | H03K 17/9622 200/600 |
| 2014/0184939 A1* | 7/2014 | Lai | G06F 3/0443 349/12 |
| 2014/0192010 A1* | 7/2014 | Lai | G06F 3/0448 345/174 |
| 2014/0210784 A1* | 7/2014 | Gourevitch | G06F 3/0443 345/174 |
| 2014/0225859 A1* | 8/2014 | Badaye | G06F 3/0446 345/174 |
| 2014/0347299 A1* | 11/2014 | Lu | G06F 3/0446 345/173 |
| 2015/0060256 A1* | 3/2015 | Kim | G06F 3/0446 200/600 |
| 2015/0253907 A1* | 9/2015 | Elias | G06F 3/045 345/174 |
| 2015/0346839 A1* | 12/2015 | Kawaguchi | G06F 3/0445 345/168 |
| 2016/0062529 A1* | 3/2016 | Jeng | G06F 3/041 345/173 |
| 2016/0170524 A1* | 6/2016 | Kim | G06F 3/0446 345/174 |
| 2016/0195983 A1* | 7/2016 | Miyake | G06F 3/0443 345/174 |
| 2016/0209952 A1* | 7/2016 | Lin | G06F 3/0446 |
| 2016/0370900 A1* | 12/2016 | Chan | G06F 3/0445 |
| 2017/0010746 A1* | 1/2017 | Hotelling | G06F 3/04166 |
| 2017/0031490 A1* | 2/2017 | Hashida | G06F 3/0448 |
| 2017/0068386 A1* | 3/2017 | Lai | G06F 3/0412 |
| 2017/0108964 A1* | 4/2017 | Sato | G06F 3/0446 |
| 2017/0147126 A1* | 5/2017 | Chiu | G06F 3/0446 |
| 2017/0212629 A1* | 7/2017 | Cho | G06F 3/0446 |
| 2017/0228067 A1* | 8/2017 | Kim | G06F 3/0446 |
| 2017/0262096 A1* | 9/2017 | Kim | G06F 3/0416 |
| 2017/0262108 A1* | 9/2017 | Lin | G02F 1/134309 |
| 2017/0277325 A1* | 9/2017 | Xie | G06F 3/0443 |
| 2018/0018040 A1* | 1/2018 | Song | H01B 1/22 |
| 2018/0196542 A1* | 7/2018 | Bohannon | G06F 3/04166 |
| 2019/0050076 A1* | 2/2019 | Zhang | G06F 3/0448 |
| 2019/0113993 A1* | 4/2019 | Lee | G06F 3/0443 |
| 2020/0098280 A1* | 3/2020 | Dohring | G09B 5/065 |
| 2020/0110496 A1* | 4/2020 | Lin | G06F 3/0446 |
| 2020/0142543 A1* | 5/2020 | Xie | G06F 3/0412 |
| 2020/0192506 A1* | 6/2020 | Ogura | H05K 1/0296 |
| 2020/0278773 A1* | 9/2020 | Ye | G06F 3/0446 |
| 2020/0312462 A1* | 10/2020 | Dubois | G16H 40/40 |
| 2021/0271344 A1* | 9/2021 | Tian | G06F 3/0445 |
| 2021/0303104 A1* | 9/2021 | Yang | G06F 3/0412 |

FOREIGN PATENT DOCUMENTS

| | | | | |
|---|---|---|---|---|
| CN | 102043548 A | | 5/2011 | |
| CN | 102945098 A | | 2/2013 | |
| CN | 104615309 A | | 5/2015 | |
| CN | 205068345 U | | 3/2016 | |
| JP | 2014-186687 A | | 10/2014 | |
| KR | 20160072336 A | * | 6/2016 | ........... G06F 3/0446 |

OTHER PUBLICATIONS

USPTO FOA dated Feb. 8, 2019 in connection with U.S. Appl. No. 15/508,756.
USPTO FOA dated Oct. 10, 2019 in connection with U.S. Appl. No. 15/508,756.
USPTO NFOA dated Jul. 15, 2019 in connection with U.S. Appl. No. 15/508,756.
USPTO NFOA dated Oct. 11, 2018 in connection with U.S. Appl. No. 15/508,756.

* cited by examiner

TOUCH STRUCTURE, TOUCH PANEL AND DISPLAY DEVICE

The present application is a Continuation application of U.S. application Ser. No. 15/508,756 filed on Mar. 3, 2017, which claims the benefits of the Chinese Patent Application No. 201520867754.7 filed on Oct. 29, 2015 and entitled 'TOUCH STRUCTURE, TOUCH PANEL AND DISPLAY DEVICE', the entire contents of which are incorporated herein by reference.

TECHNICAL FIELD

Embodiments of the present disclosure relate to a touch structure, a touch panel and a display device.

BACKGROUND

With development of a display technology, a touch panel technology enters a period of rapid development. Since a capacitive touch panel has characteristics, such as precise and sensitive positioning, good touch feel and a long service life, it attracts more and more attention. The touch panel can be divided into a mutual-capacitive touch panel and a self-capacitive touch panel according to touching modes. The mutual-capacitive touch panel can implement multi-point touch, so the mutual-capacitive touch panel becomes a mainstream of a touch panel market at present and a future trend of development.

The mutual-capacitive touch panel may also be divided into an out-cell touch panel and an in-cell touch panel; and the in-cell touch panel is also divided into an on-cell touch panel and an in-cell touch panel.

SUMMARY

Embodiments of the present disclosure relate to a touch structure, a touch panel and a display device.

According to at least one embodiment of the present disclosure, a touch structure is provided, including a plurality of repeating units, each of the repeating units including a first touch electrode and a second touch electrode intersecting with and insulated from each other, the first touch electrode being connected in a bridging manner; a dummy electrode being provided in a region of each of the repeating units not provided with the first touch electrode and the second touch electrode. A first trench and a second trench are provided respectively between the dummy electrode and the first touch electrode and between the dummy electrode and the second touch electrode; and a third trench is provided between dummy electrodes located in adjacent repeating units; the dummy electrode includes at least two sub-dummy electrodes, and a fourth trench is formed between adjacent sub-dummy electrodes located in any one of the dummy electrodes. Edges of the first trench, the second trench, the third trench and the fourth trench all have a plurality of bending points.

According to at least one embodiment of the present disclosure, a touch structure is provided, including a plurality of repeating units, each of the repeating units including a first touch electrode and a second touch electrode intersecting with and insulated from each other, the first touch electrode being connected in a bridging manner; a dummy electrode being provided in a region of each of the repeating units not provided with the first touch electrode and the second touch electrode. A first trench and a second trench are provided respectively between the dummy electrode and the first touch electrode and between the dummy electrode and the second touch electrode; and a third trench is provided between dummy electrodes located in adjacent repeating units; the dummy electrode includes at least two sub-dummy electrodes, and a fourth trench is formed between adjacent sub-dummy electrodes located in any one of the dummy electrodes. Edges of the first trench, the second trench, the third trench and the fourth trench all have a plurality of bending points.

For example, the dummy electrode, the first touch electrode and the second touch electrode are provided in a same layer and made of a same material.

For example, the repeating unit includes four dummy electrodes, and adjacent dummy electrodes are symmetrically provided along at least one of the first touch electrode and the second touch electrode.

For example, the fourth trench is provided along a diagonal direction of the repeating unit.

For example, for two opposite dummy electrodes located on one diagonal line in any one repeating unit, a direction of the fourth trench coincides with the diagonal direction.

For example, each dummy electrode includes two fourth trenches; and one of the fourth trenches has its orthographic projection at least partially coincident with the diagonal line, and the other one of the fourth trenches is close to the second touch electrode.

For example, the third trench includes more than five bending points.

For example, the second trench includes more than eight bending points.

For example, a width of a portion of the first touch electrode intersecting with the second touch electrode is 1.5 to 2.5 times the width of the second touch electrode.

For example, a size of each repeating unit in a direction along the first touch electrode is equal to the size of the repeating unit in a direction along the second touch electrode.

For example, the size of each repeating unit in the direction along the first touch electrode and the size of the repeating unit in the direction along the second touch electrode are both 3 mm to 8 mm.

According to embodiments of the present disclosure, a touch panel is provided, including a display panel and the touch structure.

For example, the display panel includes an array substrate, a color filter substrate, a liquid crystal layer located between the array substrate and the color filter substrate, an upper polarizer located on a light emergent side of the color filter substrate and a lower polarizer located on a light incident side of the array substrate; and the touch structure is provided between the color filter substrate and the upper polarizer.

For example, the touch structure further includes protective glass. The touch structure is provided between the protective glass and the display panel, and the touch structure is in contact with the protective glass.

For example, the touch structure further includes protective glass. The touch structure is provided on a substrate, and the substrate provided with the touch structure is provided between the protective glass and the display panel.

According to embodiments of the present disclosure, a display device is provided, including the touch panel.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which:

FIG. 2b is an amplified schematic diagram of a repeating unit in FIG. 2a;

FIG. 3b is an amplified schematic diagram of a repeating unit in FIG. 3a;

FIG. 4b is an amplified schematic diagram of a repeating unit in FIG. 4a;

DETAILED DESCRIPTION

Technical solutions of the embodiments will be described in a clearly and understandable way connected with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

Figure 1:
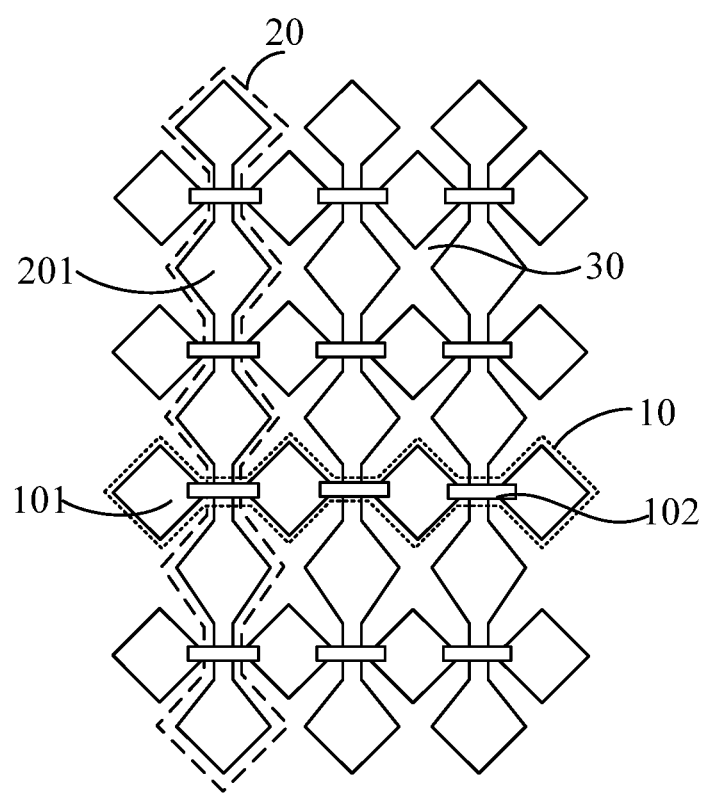
FIG. 1 is a schematic diagram of a touch structure.

As shown in FIG. 1, a touch structure applied to a mutual-capacitive touch panel includes a first touch electrode 10 and a second touch electrode 20 arranged perpendicular to each other. The first touch electrode 10 includes a plurality of first touch electrode blocks 101 arranged at intervals, adjacent first touch electrode blocks 101 being connected through a bridge 102. The second touch electrode 20 includes a plurality of second touch electrode blocks 201 directly connected. The first touch electrode block 101 and the second touch electrode 20 are formed by a same patterning process, i.e., the first touch electrode block 101 and the second touch electrode 20 are disposed in a same layer.

The inventors notice that, since insulation is required between the first touch electrode block 101 and the second touch electrode 20, it is necessary to etch a trench 30 between the two electrode blocks in an etching process. Due to effect of factors, such as material, thickness and production line process capability of a transparent conductive thin film, widths of these trenches 30 are mostly above 10 μm (for an out-cell touch panel, a width of the trench may even reach 20 μm or 30 μm). On such basis, when a display substrate is not lit or lit at a low gray scale, as irradiated with a reflected light, trenches 30 at different locations reflect light regularly, which can macroscopically produce significant stripes which are alternately dark and bright, resulting in a serious shadow dispelling phenomenon, and it is difficult to completely solve the shadow dispelling phenomenon by adjusting the etching process.

Figure 2A:
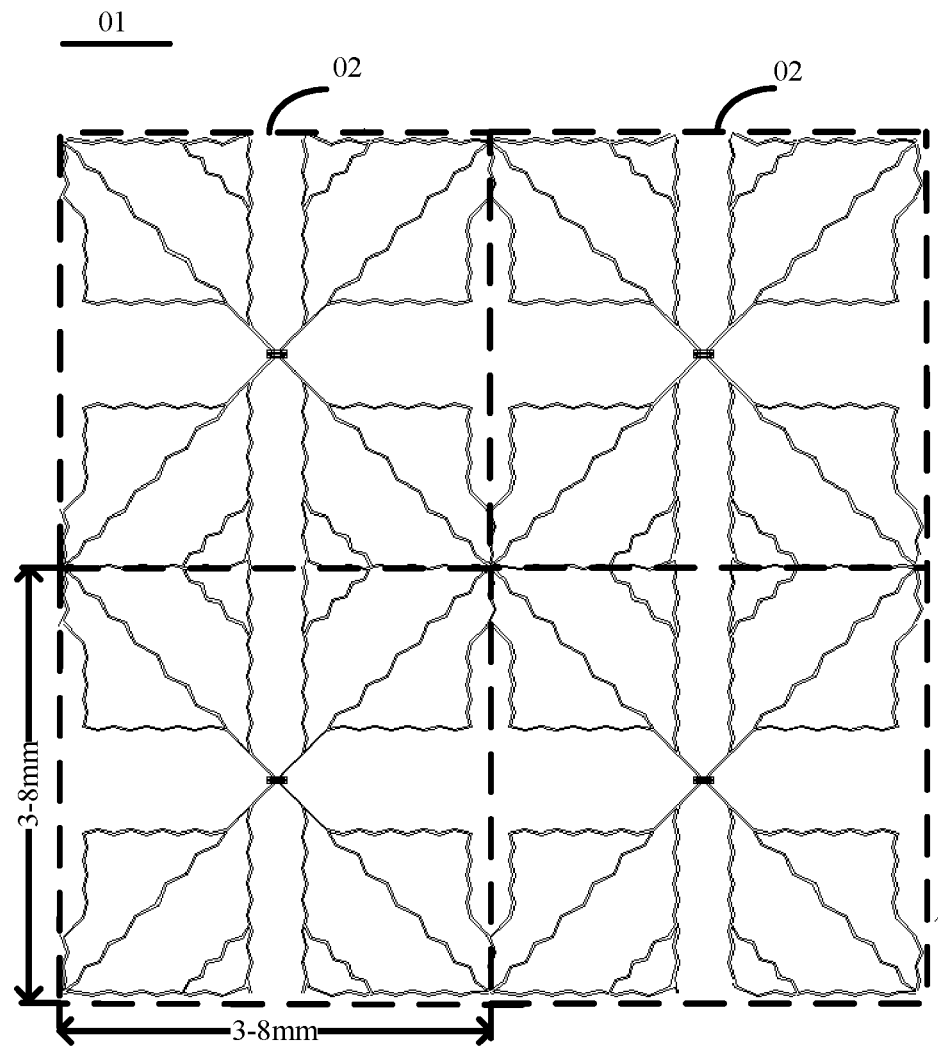
FIG. 2a is a schematic diagram of a touch structure provided by an embodiment of the present disclosure.
Figure 2B:
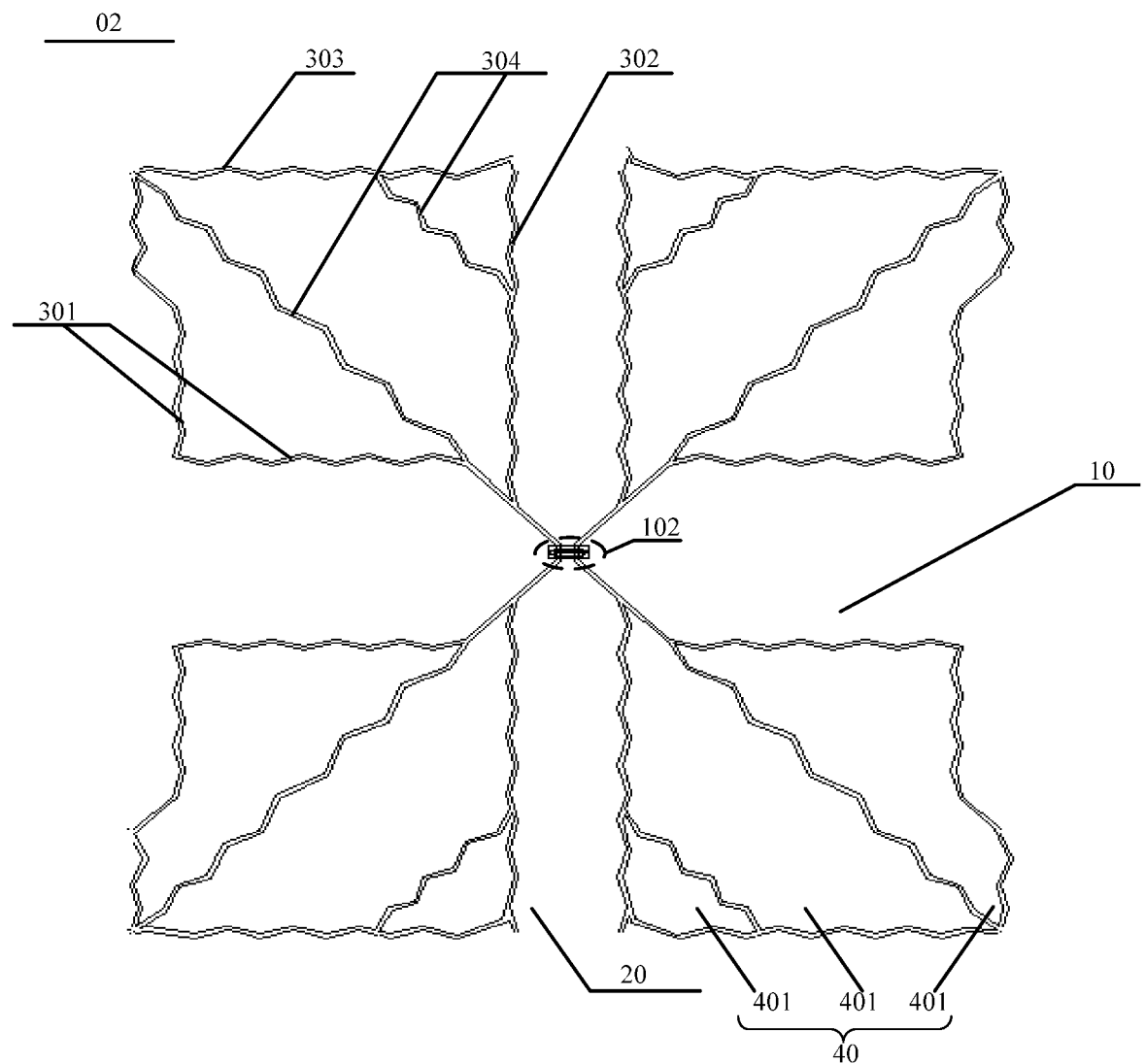
Figure 3A:
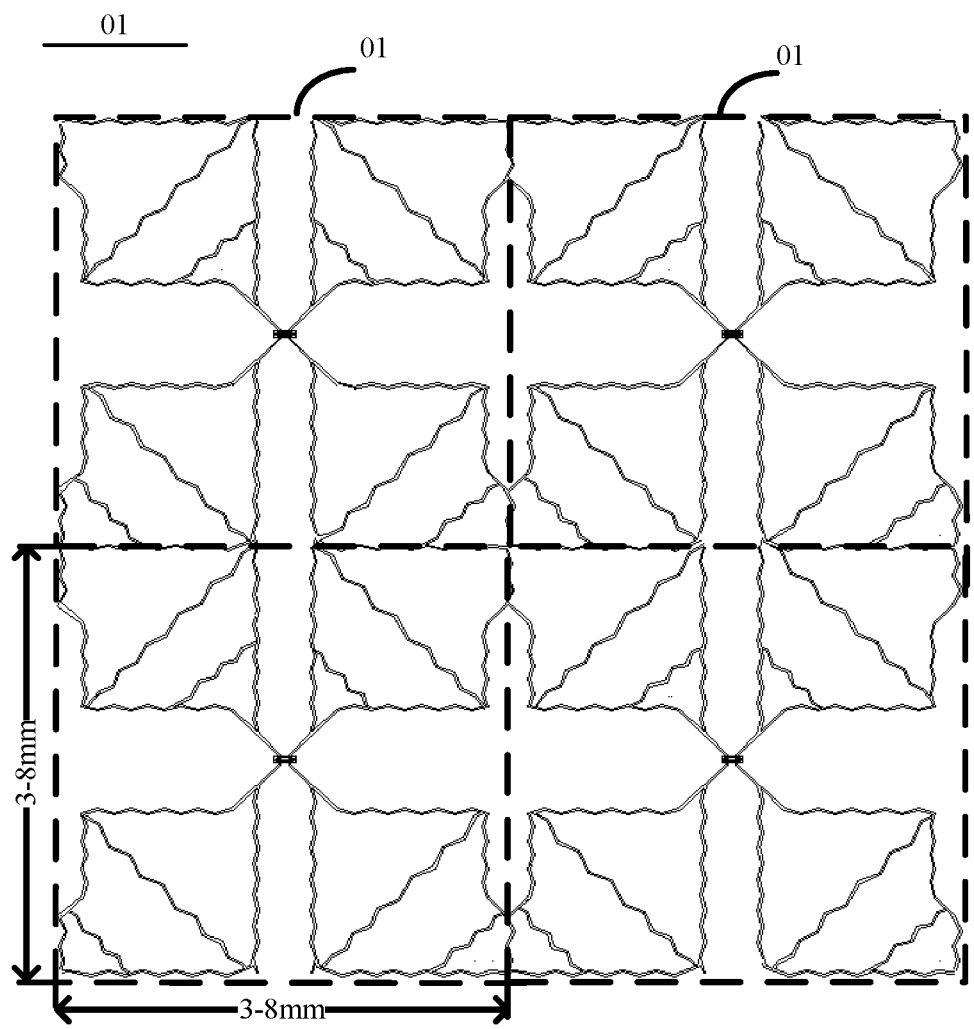
FIG. 3a is a schematic diagram of another touch structure provided by an embodiment of the present disclosure.
Figure 3B:
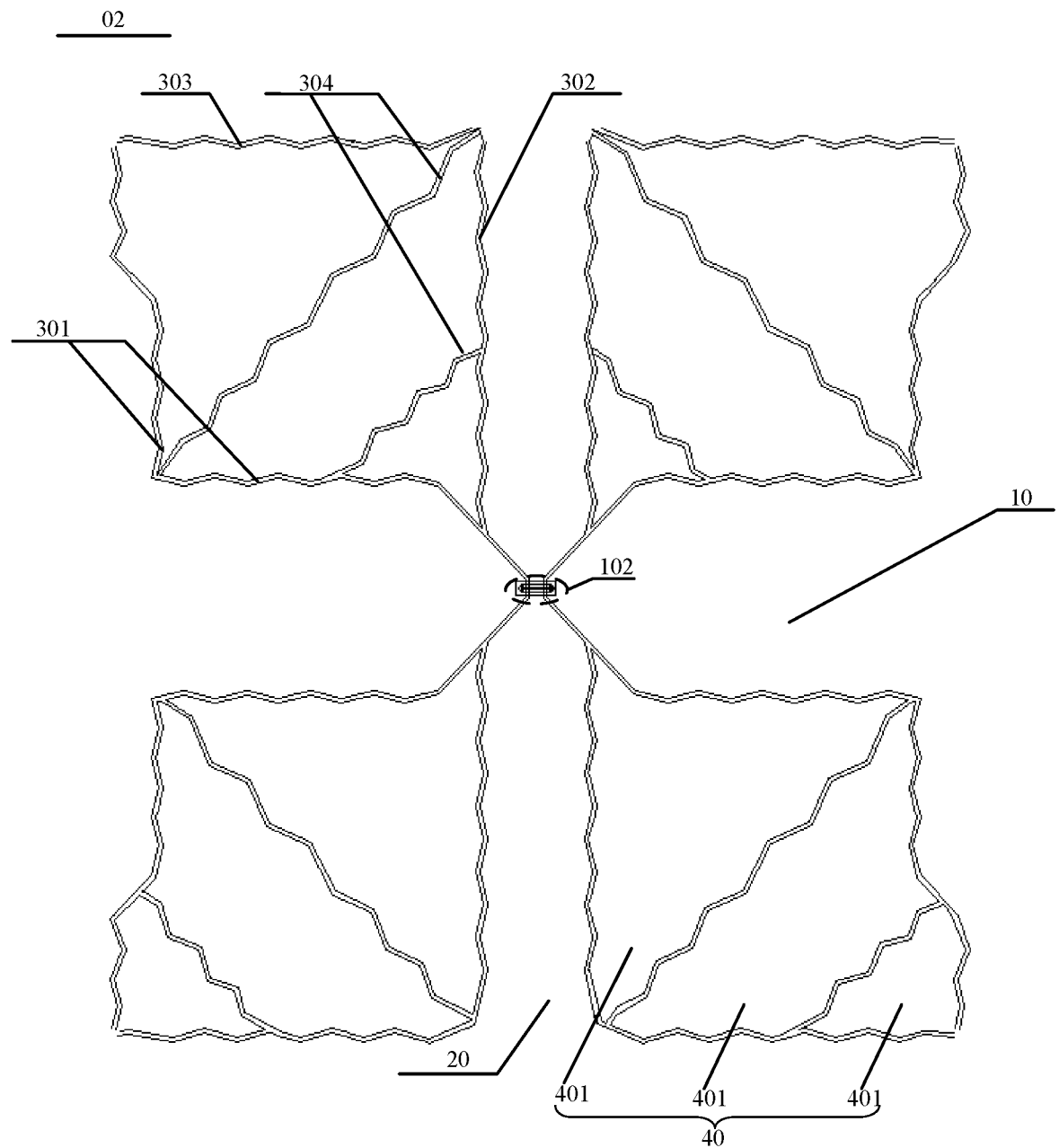
Figure 4A:
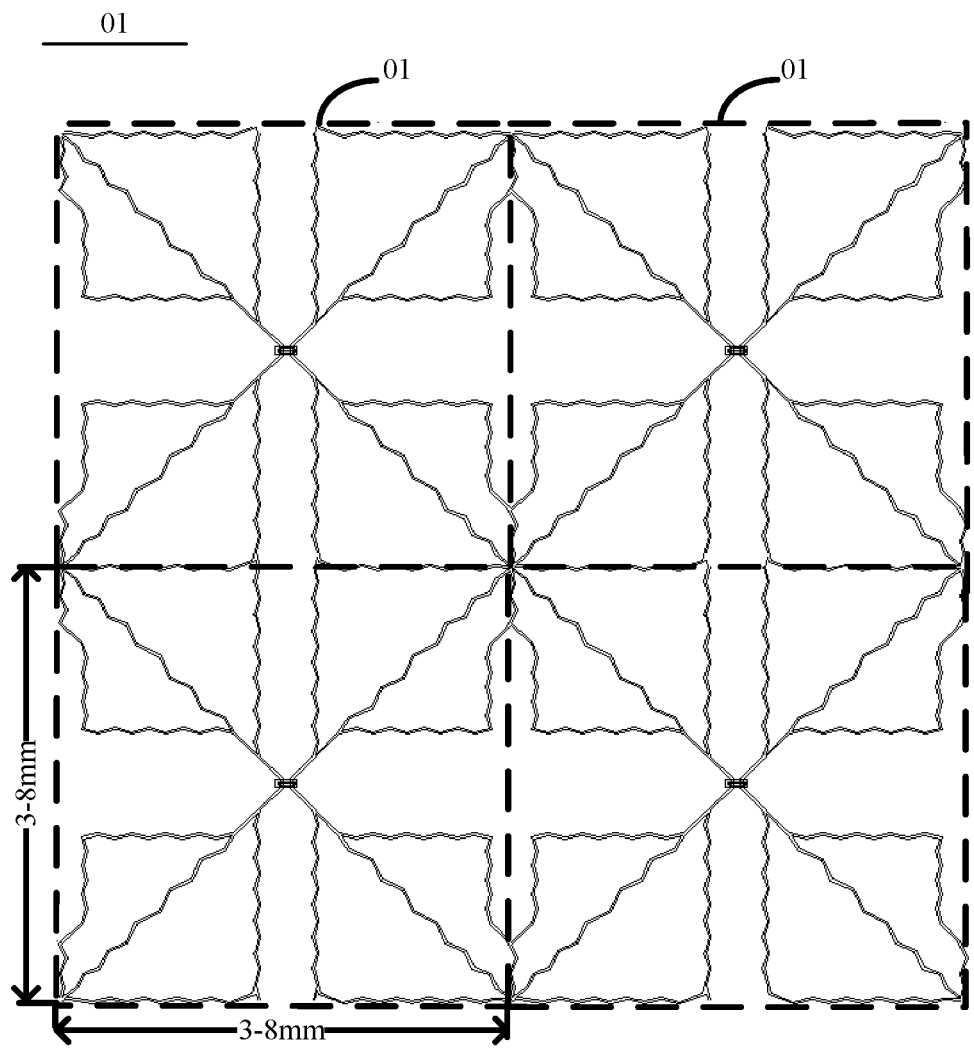
FIG. 4a is a schematic diagram of still another touch structure provided by an embodiment of the present disclosure.
Figure 4B:
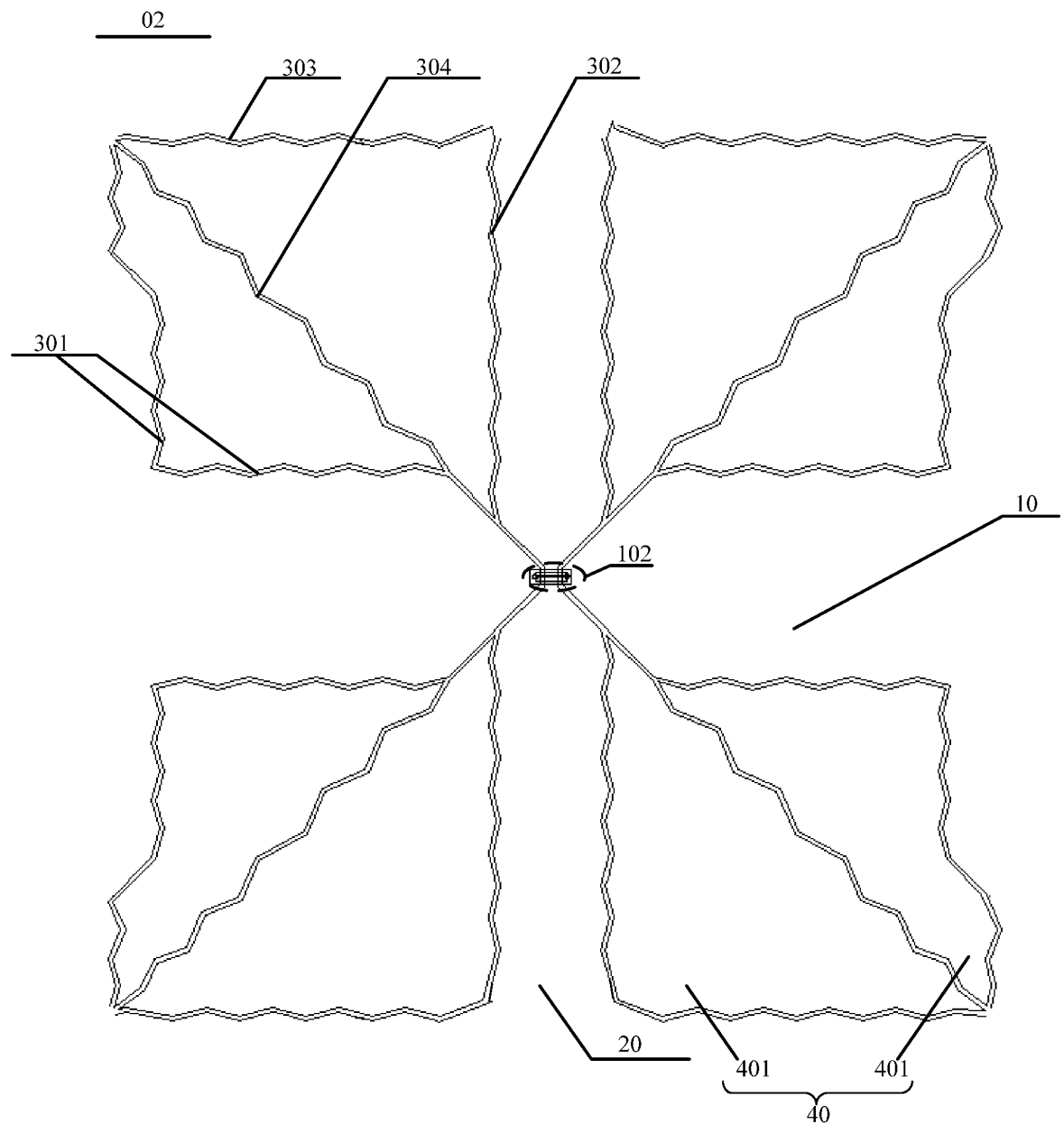

An embodiment of the present disclosure provides a touch structure 01, as shown in FIG. 2a, FIG. 3a and FIG. 4a, the touch structure 01 including a plurality of repeating units 02, as shown in FIG. 2b, FIG. 3b and FIG. 4b. Each repeating unit 02 includes a first touch electrode 10 and a second touch electrode 20 intersecting with and insulated from each other. The first touch electrodes 10 are connected in a bridging manner A dummy electrode 40 is also provided in a region of each repeating unit 02 not provided with the first touch electrode 10 and the second touch electrode 20.

A first trench 301 and a second trench 302 are provided respectively between the dummy electrode 40 and the first touch electrode 10 and between the dummy electrode 40 and the second touch electrode 20; and a third trench 303 is provided between dummy electrodes located in adjacent repeating units.

The dummy electrode 40 includes at least two sub-dummy electrodes 401, and a fourth trench 304 is provided between adjacent sub-dummy electrodes 401 located in any one of the dummy electrodes 40.

Edges of the first trench 301, the second trench 302, the third trench 303 and the fourth trench 304 all have a plurality of bending points.

It is noted that:

The number and a size of the repeating unit 02 in the touch structure 01 may be selected to be different numbers and values, which can be adjusted according to a size and touch accuracy of the touch panel.

Since the first touch electrode 10 and the second touch electrode 20 are intersecting with and insulated from each other, when the first touch electrode 10 is being formed, the first touch electrode 10 needs to be disconnected at a position intersecting with the second touch electrode 20, and on such basis, the disconnected first touch electrode 10 is connected through the bridge 102. The bridge 102 is connected with the disconnected first touch electrode 10 respectively through a via hole provided on a protective layer. The bridge 102 may be made of, for example, indium tin oxide (ITO), aluminum zinc oxide (AZO), or a metal material, such as silver (Ag).

In addition, shapes and sizes of the first touch electrode 10 and the second touch electrode 20 may be selected to be different values. For example, they may be set according to touch sensitivity, applicable IC, or the like; however, the embodiment of the present disclosure is not limited thereto.

In the embodiment of the present disclosure, for example, the first touch electrode 10 and the second touch electrode 20 are provided perpendicular to each other as a whole.

With respect to the dummy electrode 40, since it is provided in a region where the first touch electrode 10 and the second touch electrode 20 are not provided in each repeating unit 02, a position and a size of the dummy electrode 40 in each repeating unit 02 are related to the shapes and the sizes of the first touch electrode 10 and the second touch electrode 20.

For example, a dummy electrode 40 is provided in each separated region where the first touch electrode 10 and the second touch electrode 20 are not provided.

The number of sub-dummy electrodes 401 in each dummy electrode 40 may be any number greater than 2. However, in consideration that the size of the dummy electrode 40 per se will not be too large, if the number of sub-dummy electrodes 401 is too large, on the one hand, it is difficult to fabricate it, and on the other hand, it will be not better to improve a shadow dispelling effect. In this way, the number of sub-dummy electrodes 401 may be appropriately set according to the shadow dispelling effect in actual use.

For example, the number of sub-dummy electrodes 401 in each dummy electrode 40 is equal.

In addition, since the number of sub-dummy electrodes 401 in the dummy electrode 40 is equal to or greater than 2, the number of the fourth trenches 304 in each corresponding dummy electrode 40 is equal to or greater than 1.

When the number of the fourth trenches 304 in each dummy electrode 40 is equal to or greater than 2, space between adjacent fourth trenches 304 can be selected.

The number of bending points of edges of the first trench 301, the second trench 302, the third trench 303 and the fourth trench 304 can be selected. For example, in operation, the number of bending points of the edges of the respective trenches may be set according to the shadow dispelling effect.

In addition, the bending point may be relatively smooth, or may be relatively sharp; however, the embodiments of the present disclosure are not limited thereto. Shapes of the first trench 301, the second trench 302, the third trench 303 and the fourth trench 304 can be selected to improve the shadow dispelling effect.

Exemplarily, the shape of the first trench 301 may be generally L-shaped, and the shapes of the second trench 302, the third trench 303 and the fourth trench 304 may be generally strip-shaped; however, the embodiments of the present disclosure are not limited thereto.

The embodiments of the present disclosure provide a touch structure 01; by providing a dummy electrode 40 in each repeating unit 02 of the touch structure 01, a first trench 301 and a second trench 302 may be respectively formed between the dummy electrode 40 and the first touch electrode 10 and between the dummy electrode 40 and the second touch electrode 20; in addition, a third trench is formed between the dummy electrodes 40 in adjacent repeating units 02; and by dividing the dummy electrode 40 into at least 2 sub-dummy electrodes 401, a fourth trench 304 may be formed between the sub-dummy electrodes 401. In this way, a plurality of trenches are formed to allow the touch structure 01 to generate a mixed and disorderly visual feeling, so as to avoid generating regular reflection. In this way, it can improve the shadow dispelling phenomenon. In addition, the edges of these trenches all have a plurality of bending points, with respect to a relatively smooth straight line, the human eyes are not sensitive to an edge curve of the trench having the bending points, which can further improve the shadow dispelling phenomenon.

For example, the dummy electrode 40 is provided in a same layer and made of a same material as the first touch electrode 10 and the second touch electrode 20. In this way, the fabrication process can be simplified.

For example, as shown in FIGS. 2-4, the number of dummy electrodes 40 in the repeating unit 02 is 4, and adjacent dummy electrodes 40 are symmetrically provided along at least one of the first touch electrode 10 and the second touch electrode 20.

For example, as shown in FIG. 2b, two dummy electrodes 40 located above and two dummy electrodes 40 located below are all symmetrically arranged along the second touch electrode 20, and two dummy electrodes 40 located on the left side and two dummy electrodes 40 located on the right side are all symmetrically arranged along the first touch electrode 10.

In the embodiments of the present disclosure, with respect to at least one of the first touch electrode 10 and the second touch electrode 20, two adjacent dummy electrodes 40 are arranged symmetrically, which can allow the first trench 301 and the second trench 302 to be formed respectively between the dummy electrode 40 and the first touch electrode 10 and between the dummy electrode 40 and the second touch electrode 20 to be distributed in each repeating unit 02 more evenly; and even if all the trenches in the repeating unit 02 are relatively mixed and disorderly, a better shadow dispelling effect can be resulted as long as they are evenly distributed.

For example, the fourth trench 304 is provided along a diagonal direction of the repeating unit 02.

The fourth trench 304 may be provided in a diagonal direction as shown in FIG. 2b and FIG. 4b, and may also be provided in a diagonal direction as shown in FIG. 3b.

In the embodiments of the present disclosure, since the edges of the fourth trench 304 has a plurality of bending curves, the human eyes are not sensitive to the edge curves; and when the trench is provided along the diagonal direction of the repeating unit 02, light can be scattered to a larger angle with respect to the perpendicular direction, so as to further improve the shadow dispelling effect.

For example, as shown in FIG. 2b and FIG. 4b, for two opposite dummy electrodes 40 located on one diagonal line within any one repeating unit 02, the direction of the fourth trench 304 coincides with the diagonal direction.

With respect to the direction for providing the fourth trench 304 in FIG. 3b, when the fourth trench 304 is provided in the direction as shown in FIG. 2b and FIG. 4b, the best shadow dispelling effect can be achieved.

For example, as shown in FIG. 2b, for any dummy electrode 40, the number of fourth trenches 304 is 2; and one fourth trench 304 has its orthographic projection at least partially coincident with the diagonal line, and the other fourth trench 304 is close to the second touch electrode 20.

The orthographic projection is just projection along a direction perpendicular to the touch panel, when the touch structure 01 is applied to the touch panel.

In any dummy electrode 40, a length of the diagonal line is the greatest, when the orthographic projection of the fourth trench 304 partially coincides with the diagonal line, the length of the fourth trench 304 can be maximized, and the number of bending points of the fourth trench 304 may be accordingly set to be more, so that the best shadow dispelling effect can be achieved.

For example, the number of bending points of the third trench 303 is greater than 5; however, the embodiments of the present disclosure are not limited thereto.

When the number of bending points of the third trench 303 is too small, it equivalent to a smooth straight line, which results in an unsatisfactory shadow dispelling effect. In the embodiments of the present disclosure, according to a minimum size of the repeating unit 02 in practical application, the number of bending points of the third trench 303 is at least greater than 5, which is, for example, 9; however, the embodiments of the present disclosure are not limited thereto.

For example, the number of bending points of the second trench 302 is greater than 8; however, the embodiments of the present disclosure are not limited thereto.

When the number of bending points of the second trench 302 is too small, it is equivalent to a smooth straight line, which results in an unsatisfactory shadow dispelling effect. Furthermore, since the length of the second trench 302 is relatively long, in the embodiments of the present disclosure, according to the minimum size of the repeating unit 02, the number of bending points of the second trench 302 is at least greater than 8, which is, for example, 11; however, the embodiments of the present disclosure are not limited thereto.

For example, a width of a portion of the first touch electrode 10 intersecting with the second touch electrode 20 is 1.5 to 2.5 times the width of the second touch electrode 20.

By setting the widths of the first touch electrode 10 and the second touch electrode 20, and setting the first touch electrode 10 as a touch driving electrode and the second touch electrode as a touch sensing electrode, it is possible that a signal-to-noise ratio of the touch structure 01 is relatively large, so that the touch structure 01 is applicable to a plurality of integrated circuits (ICs), and can well support multi-point touch, such as 10-point touch; however, the embodiments of the present disclosure are not limited thereto.

It is noted that the width of the first touch electrode 10 refers to the width of the first touch electrode 10 in a direction along the second touch electrode 20. Likewise, the width of the second touch electrode 20 refers to the width of the second touch electrode 20 in a direction along the first touch electrode 10.

For example, as shown in FIG. 2a, FIG. 3a and FIG. 4a, the size of each repeating unit 02 in the direction along the first touch electrode 10 is equal to the size thereof in the direction along the second touch electrode 20.

It is noted that, since the first touch electrode 10 and the second touch electrode 20 are arranged intersecting with each other, that is to say, the first touch electrode 10 is provided in a first direction, the second touch electrode 20 is provided in a second direction, and the first direction and the second direction are intersecting with each other, so the size of each repeating unit 02 in the direction along the first touch electrode 10 refers to the size of the repeating unit 02 along the first direction, and the size of each repeating unit 02 in the direction along the second touch electrode 20 refers to the size of the repeating unit 02 along the second direction.

For example, the size of each repeating unit 02 may be scaled in equal proportion.

For example, as shown in FIG. 2a, FIG. 3a and FIG. 4a, the size of each repeating unit 02 in the direction along the first touch electrode 10 and the size thereof in the direction along the second touch electrode 20 are both 3 mm to 8 mm; however, the embodiments of the present disclosure are not limited thereto.

Since the size of the repeating unit 02 in the touch structure 01 can be set relatively large, it is possible to use a driver IC with a small number of channels, so as to reduce costs.

An embodiment of the present disclosure also provides a touch panel, the touch panel including a display panel and the described touch structure 01.

It is noted that the display panel according to the embodiments of the present disclosure may be a liquid crystal display panel, or may be an organic electroluminescent diode display panel; however, the embodiments of the present disclosure are not limited thereto. For example, it may also be other types of display panel.

When the display panel is a liquid crystal display panel, an array substrate in the display panel may include a thin film transistor, and a pixel electrode electrically connected with a drain electrode of the thin film transistor. On such basis, the array substrate may further include a common electrode. In an instance that the array substrate is an In-Plane Switch (IPS) type, the pixel electrode and the common electrode are provided in a same layer at intervals, and both are strip electrodes. For an array substrate of an Advanced-super Dimensional Switching (ADS) type, the pixel electrode and the common electrode are provided in different layers, the upper electrode is a strip electrode, and the lower electrode is a plate electrode. The display panel further includes a color filter substrate.

When the display panel is an organic electroluminescent diode display panel, the array substrate in the display panel may include a thin film transistor, an anode electrically connected with the drain electrode of the thin film transistor, and it may also include a cathode and an organic material functional layer. The organic material functional layer includes at least a light-emitting layer, and may further include an electron-transport layer and a hole-transport layer. On such basis, in order to improve efficiency of injecting electron and hole into the light-emitting layer, it may further include an electron injection layer provided between the cathode and the electron transport layer, and a hole injection layer provided between the anode and the hole transport layer. The display panel may further include a packaging layer. The packaging layer may be either a thin film package or a substrate package.

The touch panel according to the embodiments of the present disclosure may be either an out-cell touch panel or an in-cell touch panel.

In an instance that the touch panel is an in-cell touch panel, the embodiment of the present disclosure is, for example, an on cell touch panel.

Figure 5:
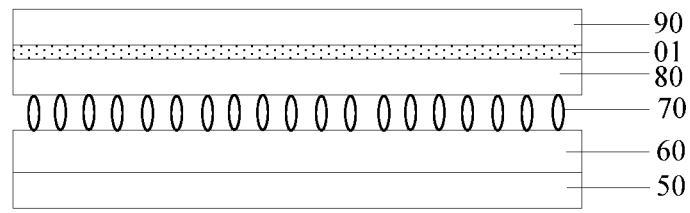
FIG. 5 is a structural schematic diagram of an in-cell touch panel provided by an embodiment of the present disclosure.

For example, when the display panel is a liquid crystal display panel, as shown in FIG. 5, the display panel of the touch panel includes an array substrate 60, a color filter substrate 80, and a liquid crystal layer 70 located between the array substrate 60 and the color filter substrate 80. The touch panel may further include an upper polarizer 90 located on a light emergent side of the color filter substrate 80 and a lower polarizer 50 located on a light incident side of the array substrate 60. The above-described touch structure 01 may be provided between the color filter substrate 80 and the upper polarizer 90.

A fabricating process, for example, may include: preparing the array substrate 60 and the color filter substrate 80, then forming the liquid crystal display panel by assembling the array substrate 60 and the color filter substrate 80; forming the described touch structure 01 above the color filter substrate 80, forming the upper polarizer 90 above the touch structure 01, and forming the lower polarizer 50 below the array substrate 60. The forming of the touch structure 01 may be, for example: ITO coating; coating photoresist; exposing, developing; etching; forming a second touch electrode 20 directly electrically connected, and a first touch electrode 10 disconnected at a position where it intersects with the second touch electrode 20; then forming a protective layer, the protective layer including a via hole; then performing metal coating; coating photoresist; exposing; developing; etching and forming a bridge 102, the bridge 102 being connected with the disconnected first touch electrode 10 through the described via hole.

In an instance that the touch panel is an out-cell touch panel, it may include touch panels of two structures as follows.

The touch panel of a first structure: the touch panel may further include protective glass; the touch structure 01 being disposed between the protective glass and the display panel, and the touch structure 01 being in contact with the protective glass.

That is, it is possible to firstly form the touch structure 01 on the protective glass, then assembling the protective glass, and the display panel, or the like, and allow the touch structure 01 formed on the protective glass to be disposed close to the display panel.

The protective glass is bonded to the outermost side of the light emergent side of the touch panel, and plays a protective role; and the touch structure 01 is disposed below the protective glass. When a human finger touches a surface of the protective glass, the touch structure 01 can sense it so as to identify a corresponding touch.

Figure 6:
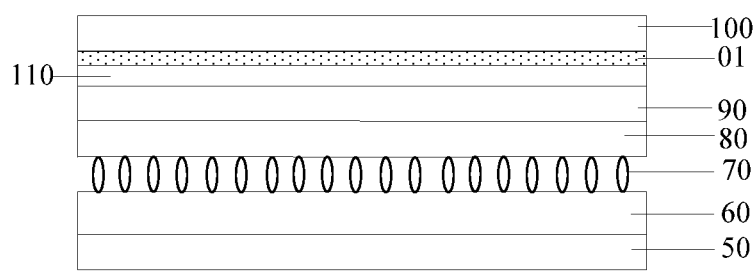
FIG. 6 is a structural schematic diagram of an out-cell touch panel provided by an embodiment of the present disclosure.

It is noted that, as shown in FIG. 6, in an instance that the display panel is a liquid crystal display panel, the touch panel also include an upper polarizer 90 and a lower polarizer 50. Since the protective glass 100 is located on the outermost side, for a touch panel of a liquid crystal type, its protective glass 100 is located above the upper polarizer 90. Since the touch structure 01 is in contact with the protective glass 100, it is located between the protective glass 100 and the upper polarizer 90. The protective glass 100 provided with the touch structure 01 is connected with the upper polarizer 90 through an Optical Clear Resin (OCR) 110.

In an instance the display panel is an organic electroluminescent diode display panel, the touch structure 01 is located between the protective glass 100 and the packaging layer.

For the touch panel as shown in FIG. 6, its fabricating process, for example, may include: preparing an array substrate 60 and a color filter substrate 80, then forming the liquid crystal display panel by assembling the array substrate 60 and the color filter substrate 80; forming an upper polarizer 90 above the color filter substrate 80, and forming a lower polarizer 50 below the array substrate 60; and preparing the above-described touch structure 01 above the protective glass 100. In addition, it may possibly include forming a light-shielding layer for shielding lines and for functioning as an ornament on the protective glass 100; then connecting the protective glass 100 having the touch structure 01 formed thereon and the upper polarizer 90 through the OCR 110. The preparing the touch structure 01 may include, for example: ITO coating; coating photoresist; exposing; developing; etching; forming a second touch electrode 20 directly electrically connected; and a first touch electrode 10 disconnected at a position where it intersects with the second touch electrode 20; then forming a protective layer, the protective layer including a via hole, then performing metal coating; coating photoresist; exposing; developing; etching and forming a bridge 102, the bridge 102 being connected with the disconnected first touch electrode 10 through the above-described via hole.

The touch panel of a second structure: the touch structure 01 may be disposed on a substrate, and the substrate disposed with the touch structure 01 may be disposed between the protective glass 100 and the display panel.

That is, it is possible to firstly form the touch structure 01 on the substrate, then bond the substrate provided with the touch structure 01 on the protective glass 100, and finally assembling the protective glass 100, the display panel, or the like, to allow the touch structure 01 formed on the protective glass 100 to be disposed close to the display panel.

Herein, since the substrate is required to bear the touch structure 01, it is required some certain hardness, and further, it is required to satisfy certain optical transparency. The substrate may be made of an optical plastic, for example, Polyethylene terephthalate (PET), Polymethyl methacrylate (PMMA) plastic, or the like; however, the embodiments of the present disclosure are not limited thereto.

Figure 7:
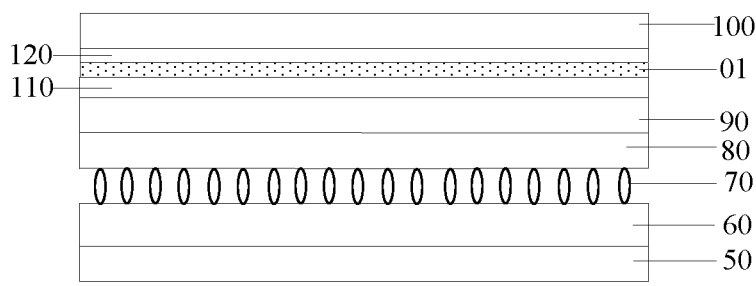
FIG. 7 is a structural schematic diagram of another out-cell touch panel provided by an embodiment of the present disclosure.

It is noted that, as shown in FIG. 7, in an instance that the display panel is a liquid crystal display panel, the touch panel also includes an upper polarizer 90 and a lower polarizer 50. Since the protective glass 100 is located on the outermost side, for the touch panel of a liquid crystal type, its protective glass 100 is located above the upper polarizer 90. Since the substrate 120 provided with the touch structure 01 is in contact with the protective glass 100, it is located between the protective glass 100 and the upper polarizer 90. The protective glass 100 provided with the touch structure 01 is connected with the upper polarizer 90 through the OCR 110.

In an instance that the display panel is an organic electroluminescent diode display panel, the substrate 120 provided with the touch structure 01 is located between the protective glass 100 and the packaging layer.

An embodiment of the present disclosure also provides a display device, the display device including the described touch panel.

The described display device, for example, can be any one of products or parts with a touch function, such as a liquid crystal display, an organic electroluminescent diode display, a mobile phone, a tablet personal computer or the like.

The embodiments of the present disclosure provide a touch structure, a touch panel and a display device; by providing the dummy electrode in each repeating unit of the touch structure, the first trench and the second trench may be respectively formed between the dummy electrode and the first touch electrode and between the dummy electrode and the second touch electrode; in addition, the third trench is formed between the dummy electrodes in the adjacent repeating units; and by dividing the dummy electrode into at least 2 sub-dummy electrodes, the fourth trench may be formed between the sub-dummy electrodes; since a plurality of trenches are provided, the touch structure is capable of generating a mixed and disorderly visual feeling, so as to avoid generating regular reflection, and thus, it can reduce the shadow dispelling phenomenon. In addition, since the edges of these trenches all have a plurality of bending points, with respect to a relatively smooth straight line, the human eyes are insensitive to an edge curve of the trench having the bending points, which can further improve the shadow dispelling phenomenon.

The described above are only exemplary embodiments of the present disclosure, and the present disclosure is not intended to limited thereto. For one of ordinary skill in the art, various changes and alternations may be made without departing from the technical scope of the present disclosure, and all of these changes and alternations shall fall within the scope of the present disclosure.

What is claimed:

1. A touch structure, comprising a plurality of repeating units wherein each of the repeating units comprises:
   a first touch electrode extending in a first direction, the first touch electrode being connected at positions of first tip sections by a bridge;
   a second touch electrode extending in a second direction, the second touch electrode being directly electrically connected, and the second touch electrode intersecting with and insulated from the first touch electrode at the positions of the first tip sections of the first touch electrode; and
   dummy electrodes provided in regions of each of the repeating units not provided with the first touch electrode and the second touch electrode;
   wherein each of the dummy electrodes comprises at least two sub-dummy electrodes;
   first trenches are provided between the first touch electrode and any corresponding dummy electrode adjacent to the first touch electrode;

a second trench is provided between the second touch electrode and any corresponding dummy electrode adjacent to the first touch electrode; and a third trench is provided between dummy electrodes located in adjacent repeating units;

fourth trenches are provided between any two adjacent sub-dummy electrodes located in each of the dummy electrodes;

edges of the first trenches, the second trench, the third trench and the fourth trenches all have a plurality of bending points; and the fourth trenches include a trench that extends from the first trench to the second trench, a trench that extends from the first trench to the third trench, and a trench that extends form an intersection point of two first trenches, adjacent to each other, of the same dummy electrode to an intersection point of the second trench and an adjacent third trench of the same dummy electrode, such that the arrangement of the fourth trenches in two dummy electrodes arranged along the FIRST touch electrode extending across the FIRST direction are symmetrical while two dummy electrodes arranged along the second touch electrode extending across the second direction are NOT symmetrical.

2. The touch structure according to claim 1, wherein each of the dummy electrodes comprises three sub-dummy electrodes, two fourth trenches formed by adjacent sub-dummy electrodes of each of the dummy electrodes in each repeating units are parallel to each other, one of the two fourth trenches extends from the first trench to the second trench, or from the first trench to the third trench, another one of the two fourth trenches extends from the intersection point of the two adjacent first trenches of the same dummy electrode to the intersection point of the second trench and the adjacent third trench of the same dummy electrode.

3. The touch structure according to claim 2, wherein the sub-dummy electrodes are in triangle shape and trapezoid shape, respectively.

4. The touch structure according to claim 3, wherein the sub-dummy electrodes in each dummy electrode are arranged in an order of the triangle shaped sub-dummy electrode, the trapezoid shaped sub-dummy electrode, and the triangle shaped sub-dummy electrode along a direction along a diagonal line.

5. The touch structure according to claim 1, wherein the second trench comprises more than eight bending points, and the third trench comprises more than five bending points.

6. The touch structure according to claim 1, wherein the dummy electrodes, the first touch electrode, and the second touch electrode are provided in a same layer and made of a same material.

7. The touch structure according to claim 1, wherein adjacent dummy electrodes are symmetrically provided along the first touch electrode and the second touch electrode.

8. The touch structure according to claim 1, wherein a size of each repeating unit along the first direction is equal to a size of the repeating unit along the second direction.

9. The touch structure according to claim 1, wherein a size of each repeating unit along the first direction and a size of the repeating unit along the second direction are both 3 mm to 8 mm.

10. A touch panel, comprising a touch structure, wherein touch structure, comprising a plurality of repeating units, wherein each of the repeating units comprises:

a first touch electrode extending in a first direction, the first touch electrode being connected at positions of first tip sections by a bridge;

a second touch electrode extending in a second direction, the second touch electrode being directly electrically connected, and the second touch electrode intersecting with and insulated from the first touch electrode at the positions of the first tip sections of the first touch electrode; and dummy electrodes provided in regions of each of the repeating units not provided with the first touch electrode and the second touch electrode;

wherein each of the dummy electrodes comprises at least two sub-dummy electrodes;

first trenches are provided between the first touch electrode and any corresponding dummy electrode adjacent to the first touch electrode;

a second trench is provided between the second touch electrode and any corresponding dummy electrode adjacent to the first touch electrode; and a third trench is provided between dummy electrodes located in adjacent repeating units;

fourth trenches are provided between any two adjacent sub-dummy electrodes located in each of the dummy electrodes;

edges of the first trenches, the second trench, the third trench and the fourth trenches all have a plurality of bending points; and the fourth trenches include a trench that extends from the first trench to the second trench, a trench that extends from the first trench to the third trench, and a trench that extends form an intersection point of two first trenches, adjacent to each other, of the same dummy electrode to an intersection point of the second trench and an adjacent third trench of the same dummy electrode, such the FIRST touch electrode extending across the FIRST direction are symmetrical while second direction are NOT symmetrical.

11. The touch panel according to claim 10, further comprising a display panel, wherein the display panel comprises an array substrate, a color filter substrate, a liquid crystal layer between the array substrate and the color filter substrate, an upper polarizer provided on a light emergent side of the color filter substrate and a lower polarizer provided on a light incident side of the array substrate; and the touch structure is provided between the color filter substrate and the upper polarizer.

12. The touch panel according to claim 11, further comprising a protective glass layer; the touch structure being provided between the protective glass layer and the display panel, and the touch structure being in contact with the protective glass layer.

13. The touch panel according to claim 11, further comprising a protective glass layer;

wherein the touch structure is provided on a substrate, and the substrate provided with the touch structure is provided between the protective glass layer and the display panel.

14. A display device, comprising a touch panel, wherein the touch panel comprises a touch structure, wherein touch structure, comprises a plurality of repeating units, wherein each of the repeating units comprises:

a first touch electrode extending in a first direction, the first touch electrode being connected at positions of first tip sections by a bridge;

a second touch electrode extending in a second direction, the second touch electrode being directly electrically connected, and the second touch electrode intersecting with and insulated from the first touch electrode at the positions of the first tip sections of the first touch electrode; and dummy electrodes provided in regions of each of the repeating units not provided with the first touch electrode and the second touch electrode;

wherein each of the dummy electrodes comprises at least two sub-dummy electrodes;

first trenches are provided between the first touch electrode and any corresponding dummy electrode adjacent to the first touch electrode;

a second trench is provided between the second touch electrode and any corresponding dummy electrode adjacent to the first touch electrode; and a third trench is provided between dummy electrodes located in adjacent repeating units;

fourth trenches are provided between any two adjacent sub-dummy electrodes located in each of the dummy electrodes;

edges of the first trenches, the second trench, the third trench and the fourth trenches all have a plurality of bending points; and the fourth trenches include a trench that extends from the first trench to the second trench, a trench that extends from the first trench to the third trench, and a trench that extends form an intersection point of two first trenches, adjacent to each other, of the same dummy electrode to an intersection point of the second trench and an adjacent third trench of the same dummy electrode, such that the arrangement of the fourth trenches in tow dummy electrodes arranged along the FIRST touch electrode extending across the FIRST direction are symmetrical while two dummy electrodes arranged along the second touch electrode extending across the second direction are NOT symmetrical.

15. The display device according to claim 14, further comprising a display panel, wherein the display panel comprises an array substrate, a color filter substrate, a liquid crystal layer between the array substrate and the color filter substrate, an upper polarizer provided on a light emergent side of the color filter substrate and a lower polarizer provided on a light incident side of the array substrate; and
the touch structure is provided between the color filter substrate and the upper polarizer.

16. The display device according to claim 15, further comprising a protective glass layer; the touch structure being provided between the protective glass layer and the display panel, and the touch structure being in contact with the protective glass layer.

17. The touch panel according to claim 10, wherein each of the dummy electrodes comprises three sub-dummy electrodes, two fourth trenches formed by adjacent sub-dummy electrodes in each repeating units are parallel to each other, one of the two fourth trenches extends from the first trench to the second trench, or from the first trench to the third trench, another one of the two fourth trenches extends from the intersection point of the two adjacent first trenches of the same dummy electrode to the intersection point of the second trench and the adjacent third trench of the same dummy electrode.

18. The display device according to claim 14, wherein each of the dummy electrodes comprises three sub-dummy electrodes, two fourth trenches formed by adjacent sub-dummy electrodes in each repeating units are parallel to each other, one of the two fourth trenches extends from the first trench to the second trench, or from the first trench to the third trench, another one of the two fourth trenches extends from the intersection point of the two adjacent first trenches of the same dummy electrode to the intersection point of the second trench and the adjacent third trench of the same dummy electrode.

* * * * *